July 25, 1939.   E. C. HORTON   2,167,207
WINDSHIELD WIPER
Filed March 11, 1935
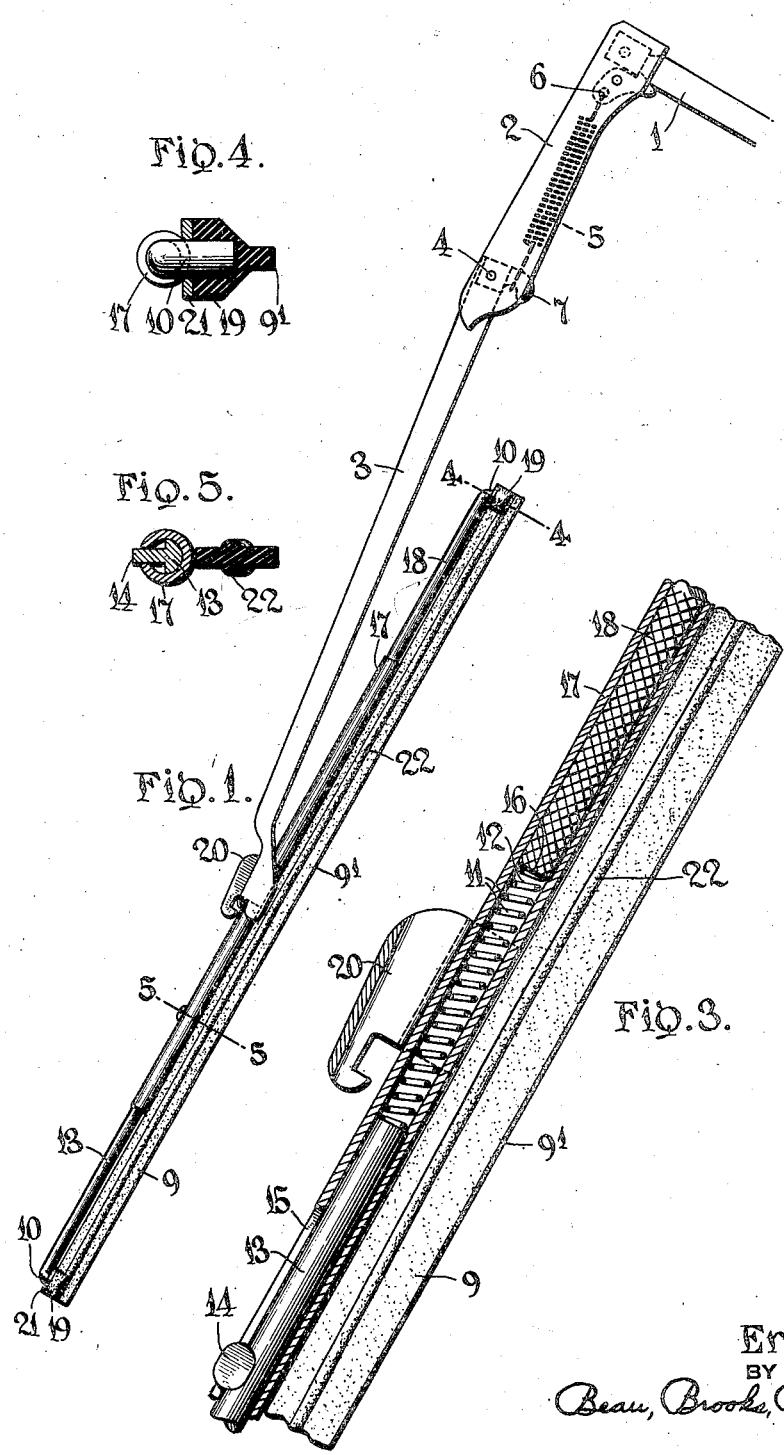
INVENTOR
Erwin C. Horton,
BY
Beau, Brooks, Buckley & Beau.
ATTORNEYS Patented July 25, 1939

2,167,207

UNITED STATES PATENT OFFICE 2,167,207

WINDSHIELD WIPER

Erwin C. Horton, Hamburg, N. Y., assignor to Trico Products Corporation, Buffalo, N. Y.

Application March 11, 1935, Serial No. 10,523

6 Claims. (Cl. 15—245)

This invention relates to a window wiper and is especially adapted for use with the automatic windshield cleaners with which present day motor vehicles are equipped.

The windshield wiper or blade, now generally in use on motor vehicles, comprises a rigid channeled holder and a rubber wiping element secured in the channel of the holder throughout its length. The channel tends to restrict free conformity of the wiping edge to the window surface. Furthermore, after continued use, or under the heavy spring pressure of its carrying arm, the rubber wiping element becomes deformed or set in a manner to impair its wiping efficiency, the rubber losing its resiliency somewhat and resulting in a scratching of the glass surface.

The present invention has for its object to provide a wiper which is more efficient in operation, providing a wiping contact which is more conformable to the window surface and one which will have a prolonged period of usefulness.

In the drawing:

Fig. 1 is a fragmentary showing of a window cleaner embodying a wiper constructed in accordance with the present invention;

Fig. 2 is a top plan view of the wiper per se;

Fig. 3 is a fragmentary longitudinal section through the wiper, illustrating more clearly the tensioned structure of the preferred embodiment; and Figs. 4 and 5 are transverse sectional views taken respectively along lines 4—4 and 5—5 of Fig. 1.

Referring more particularly to the drawing, the numeral 1 designates the actuating shaft of a windshield cleaner to the outer end of which is fixed the inner section 2 of an articulated wiper carrying arm. To this inner section is hinged the outer section 3, as by pin 4, the outer end of the section 3 being urged toward the window glass by a spring 5 which has one end anchored at 6 to the fixed section 2, and its opposite end to a bell crank extension 7 of said section 3.

The outer end of the arm carries a wiper which comprises a holder and a squeegee or wiping element. According to the present invention the holder is provided with spaced squeegee supporting parts 10 which are resiliently connected and adapted to support the squeegee 9 under a spring tension thereby to exert a pull on the squeegee lengthwise of its body. Preferably the squeegee is of strip formation with one longitudinal edge of the strip being supported in wiping engagement with the window surface and the opposite edge portion being unsupported by the holder, intermediate said supporting parts 10. Such preferred construction permits the intermediate body portion of the squeegee to readily yield and accommodate itself to surface irregularities for a more thorough and efficient wiping operation.

The holder body may be possessed of inherent resiliency, sufficient to have the supporting parts 10 exert the desired longitudinal tension on the wiping element. However, it is preferred to have this tension placed upon the squeegee body by separate spring element 11. This spring may be conveniently concealed within the pocket 12 of the body of the holder, and so disposed as to project the extensible body section 13 for increasing the over-all length of the holder. According to the illustration, the extensible section 13 has its inner end received in the pocket 12 in a telescopic fashion and is constrained to a sliding movement therein by a feather 14 which operates in a slot 15 of the holder body. The tensioned spring 11 is compressed between the inner end of the extensible section 13 and a fixed anchorage or shoulder 16 within the pocket 12 so that the tendency or urge of the spring will be to project the section 13 and thereby support the squeegee under a longitudinal strain.

The fixed body section of the holder may be of simple construction, that illustrated comprising a tube 17, forming the pocket 12 and a supporting section 18 received by the tube 17 and fixed thereto. The inner end of section 18 may therefore constitute the shoulder 16.

The squeegee supporting parts 10 may simply comprise outturned extremities of the holder sections 13 and 18 as illustrated. The mode of attachment of the squeegee to these supporting parts 10 may also be simplified as by providing socketed enlargements 19 on the squeegee body. For mounting the squeegee on its holder, the outturned extremities 10 are engaged in the sockets of the enlargements 19, after first reducing the over-all length of the holder as by telescoping the section 13 within the pocket 12. After the squeegee supporting parts 10 have been properly positioned within the sockets of the enlargements 19 and the holder section 13 released, the spring will project said section 13 to thereby place the squeegee body under tension. An attaching fin or connector part 20 is provided on the holder to permit attachment of the wiper to the outer end of the carrying arm section 3.

As above stated the squeegee is preferably of rubber in strip form so that one longitudinal edge 9' thereof will bear upon the surface being acted upon and constitute a wiping edge for the squeegee, which edge may extend beyond the supporting parts 10, as shown. The opposite or inner longitudinal edge of the strip-like squeegee body is preferably unsupported by the holder between the supporting parts 10, although under the pressure of the carrying arm it may be given light intermediate support throughout its length or at certain intermediate portions as by the tube 17. The spacing of such inner edge from the holder may be determined by the collars 21 which are threaded over the supporting parts 10.

Means are provided for augmenting the pressure against the window of portions of the squeegee strip intermediate its ends so as to insure a firm wiping contact of such intermediate portion with the window as the wiper is moved back and forth thereover. According to the present disclosure, this means is incorporated in the make-up of the strip, although it may be of separate construction if desired. To this end a resilient bowed member or part 22 is connected to the strip and extends longitudinally thereof, the opposite ends of such bowed member being disposed adjacent the wiping edge 9' at the opposite ends of the strip, while the intermediate portion is bowed away from such wiping edge so that when the strip is tensioned and held supported under tension by the terminals 10, the bowed member will be distended so that the intermediate portion thereof will tend to straighten and thereby urge the intermediate portion of the wiping edge firmly against the window surface. The bowed member may be formed integrally with and as a part of the strip 9 and may assume the shape of a rib on one or both sides of the strip. Therefore, when the strip is stretched or tensioned to engage the socketed enlargements 19 with the supporting terminals 10, the curved or bowed rib 22 will be somewhat flexed with the intermediate bowed portion tending to force the intermediate wiping edge portion to assume a definite, although slight, convexity, and by reason of the reinforcement given the intermediate wiping edge portion by such rib, a firm wiping engagement with the window surface will be provided. The strip, however, will be free of lateral confinement and will, therefore, readily follow the surface contour of the window to effect a thorough wiping thereof.

By this tensioned support of the squeegee the latter is given a free or floating contact with the window surface throughout the major portion of its length and throughout practically its entire wiping engagement so that the wiping edge will readily conform to irregularities in the surface being wiped. Furthermore, it will be observed that the squeegee is free from any lateral confinement or support between the supporting parts 10 whereby to increase its flexibility or yieldability as it wipes over the surface.

When it becomes necessary to replace or repair the squeegee, it is simply necessary to disengage the socketed enlargements 19 from their supporting parts 10 for removing said squeegee. Obviously, contraction of the holder during the demounting or replacement of the squeegee may readily be effected by reason of the resilient connection of such parts.

What is claimed is:

1. A window wiper having a holder with resiliently connected squeegee supporting parts, and a flexible squeegee having terminal connectors engaged with said parts with one edge supported under tension thereby in a plane beyond the supporting parts for wiping contact with the surface to be cleaned.

2. A cleaner for windshields of motor vehicles having a wiper, and an actuator for the wiper, said wiper having a holder with resiliently connected squeegee supporting parts, means on the holder for attaching the wiper to its actuator, and a flexible squeegee having terminal connectors engaged with said parts with one edge supported under tension thereby in a plane beyond the supporting parts for wiping contact with the surface to be cleaned.

3. A window wiper having a holder with spaced squeegee supporting parts, a flexible strip having its end portions connected to said parts under tension and presenting one longitudinal edge of the strip for wiping engagement with the window surface, said strip being free of lateral support by the holder intermediate said supporting parts, and said longitudinal wiping edge being disposed in a plane off-set beyond said supporting parts.

4. A window wiper having a holder with spaced squeegee supporting parts, and a flexible squeegee strip supported under tension by said supporting parts with one edge presented for wiping contact in a plane outwardly disposed from the supporting parts.

5. In a window wiper having a holder with spaced squeegee supporting parts, a flexible squeegee strip supported under tension by said supporting parts with one edge presented for wiping contact, and means forming a part of the strip and functioning by and during the tensioned support of the strip to urge the intermediate wiping edge portion of the strip toward the window.

6. In a window wiper having a holder with spaced squeegee supporting parts, a flexible squeegee strip supported under tension by said supporting parts with one edge presented for wiping contact, and a resilient bowed part embodied in the strip lengthwise of the strip for flexing the intermediate wiping edge portion toward the window surface by and during the tensioned support of the strip.

ERWIN C. HORTON.